INVENTOR
Archie B. McElroy
William E. Presley &
Elliott Forbis

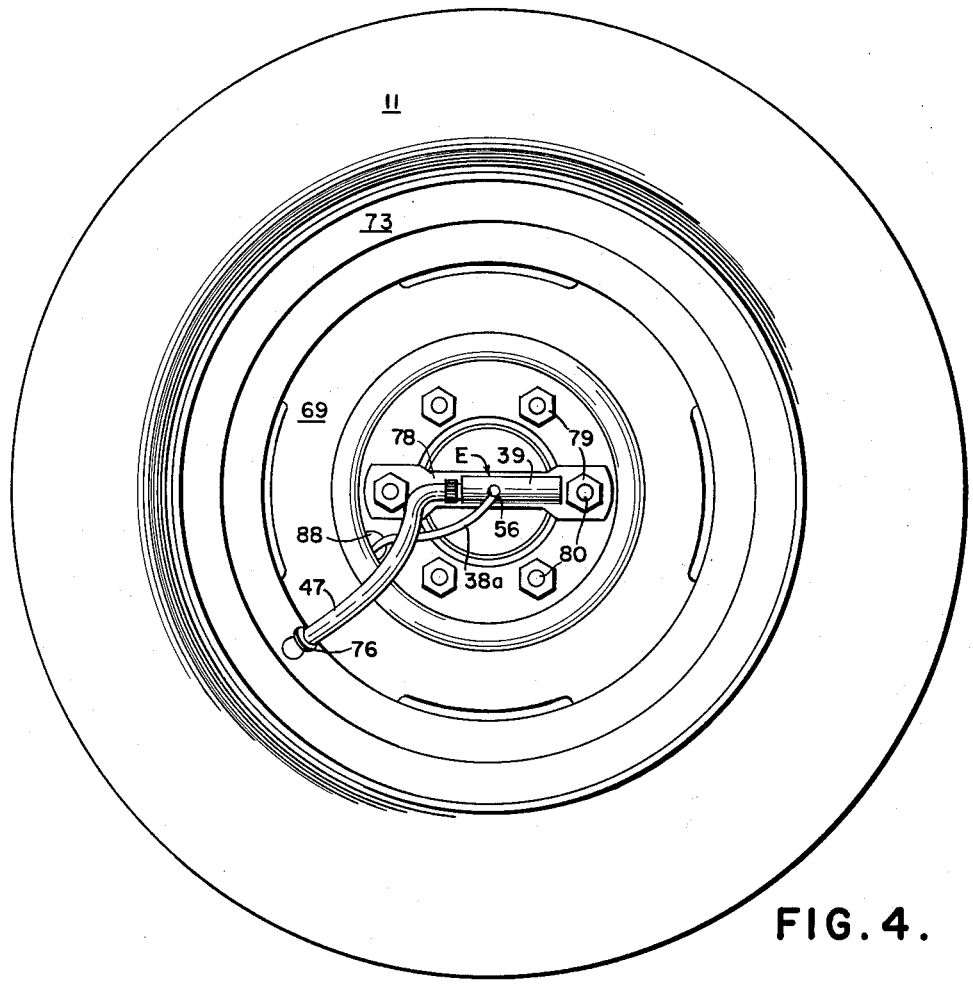
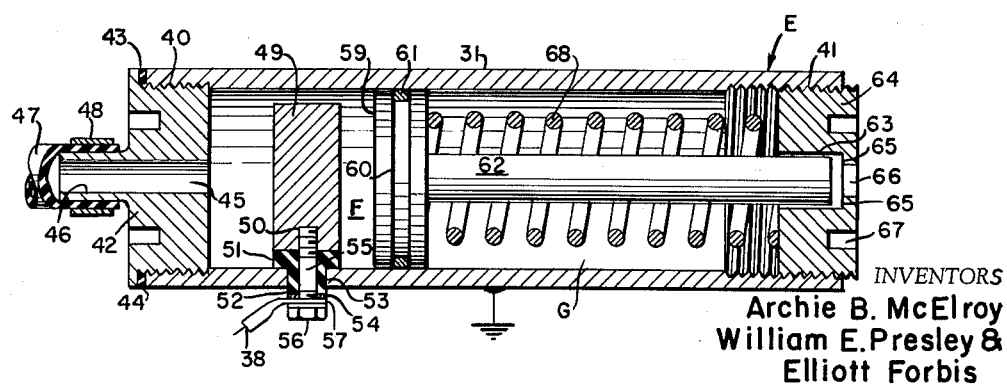
FIG. 4.
FIG. 5.
INVENTORS
Archie B. McElroy
William E. Presley &
Elliott Forbis
BY Wilkinson, Mawhinney & Theibault
ATTORNEYS

United States Patent Office 3,238,500
Patented Mar. 1, 1966

3,238,500
TIRE PRESSURE SIGNAL
Archie B. McElroy, R.F.D. 3, Stroud, Okla.; William E. Presley, R.F.D. 2, Stroud, Okla.; and Elliott Forbis, P.O. Drawer 517, Davenport, Okla.
Filed Mar. 13, 1963, Ser. No. 264,971
2 Claims. (Cl. 340—58)

The present invention relates to tire pressure signal and more particularly to a system by which at a central position, for instance the driver's seat in an automobile or the cab in a truck, individual signals may be given of under-inflation of any of the tires on any of the wheels of the vehicle or the spare tire or tires.

An object of the invention is to provide a simple system of the character above indicated which is adapted to the jarring movements of vehicles so that it will unfailingly operate in all conditions and, accordingly, it is a further object of the invention to so design and construct the various components of the system that they will be extremely practicable, resistant to all motions of the vehicles which might tend to incapacitate them, and in general to provide a foolproof and reliable signalling system which can be depended upon at all times to advise drivers of vehicles of the existence of dangerously low pressures in any tires including the spares, all to the end of promoting safety in the operation of such vehicles and convenience to the operators in that by giving them due notice of under-inflation they may have timely resort to service stations where the repairs and adjustments may be more conveniently and more safely attended to than out on the highway under hazards of traffic conditions.

Pursuant to the foregoing objects, it is a further object of the present invention to provide an improved form of air switch and an improved form of brush holder and of other components of the system all contributing to the elimination of emergencies and hazards.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 4 is a plan view of a conventional wheel and tire showing a form of application of the air switch thereto.

FIGURE 5 is a longitudinal sectional view taken through a preferred form of air switch.

Figure 1:
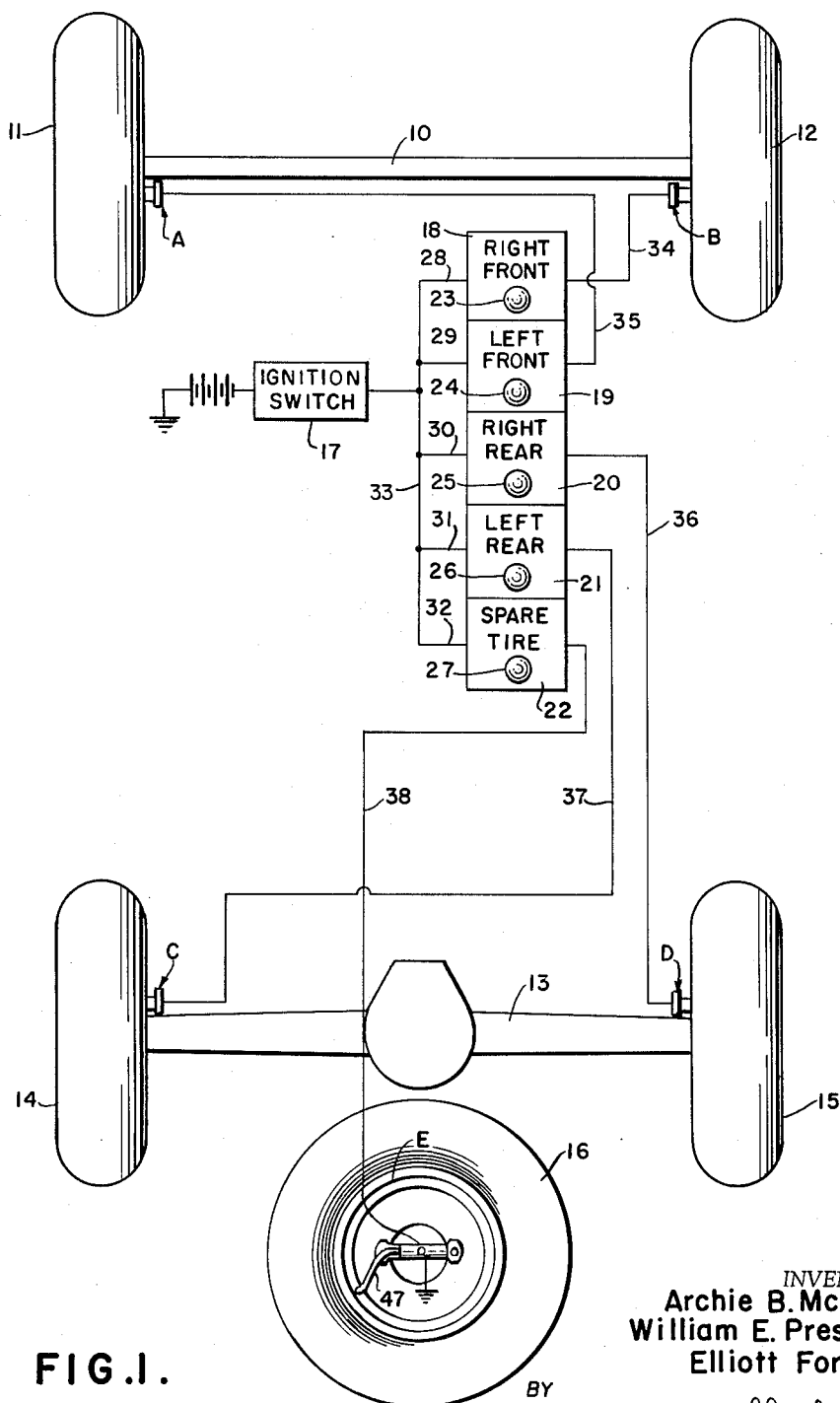
FIGURE 1 is a diagrammatic view of a tire pressure signal system constructed in accordance with the present invention.

Referring more particularly to the drawings and for the present to FIGURE 1 which shows a form of circuit diagram suitable for use in connection with the system.

In this circuit diagram 10 designates the front axle of an automobile or truck, 11 the left front tire, 12 the right front tire, 13 the rear axle, 14 the left rear tire, 15 the right rear tire and 16 the spare tire usually carried in the trunk at the rear of a passenger automobile or in various locations on trucks.

The conventional ignition switch is indicated at 17 grounded at one side on the vehicle frame.

On the instrument board or other suitable location in the driver's compartment of a passenger automobile or in the cab of a truck various signal panels are provided, each having a signal lamp and a legend indicative of the various tires including the spare, namely, a signal panel 18 bears the legend Right Front, a signal panel 19 bears the legend Left Front, a signal panel 20 bears the legend Right Rear, a signal panel 21 bears the legend Left Rear and a signal panel 22 bears the legend Spare Tire.

In the order just described these signal panels also contain lamps 23, 24, 25, 26 and 27 as representative of visual or audible signals. These lamps are in turn connected respectively to electrical leads 28, 29, 30, 31 and 32 which merge in a common conductor 33 by which all of the lamps or other signals are placed in circuit with the ignition switch 17 and the vehicle battery or other source of electromotive force.

The other sides of the lamps are respectively connected by electric circuit wires 34, 35, 36, 37 and 38 to the wheel actuating units A, B, C, D and E.

Figure 3:
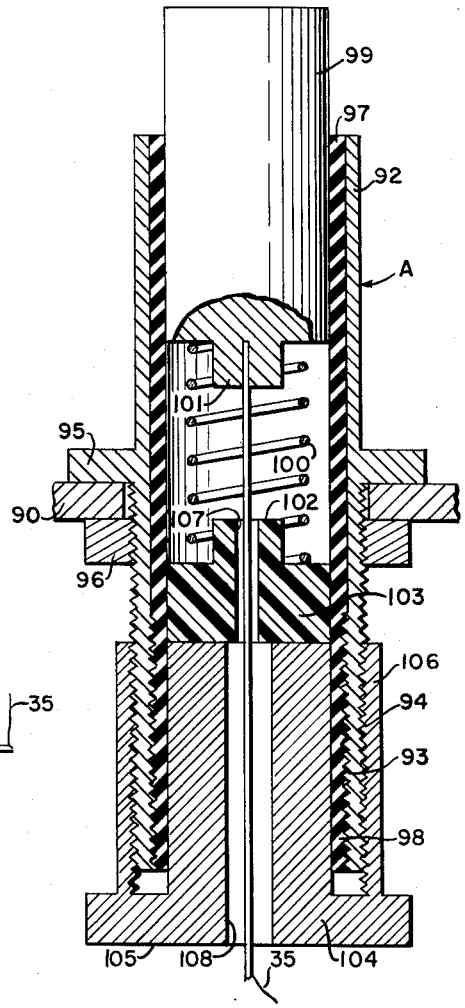
FIGURE 3 is a longitudinal sectional view taken on an enlarged scale through a preferred form of brush holder.
Figure 6:
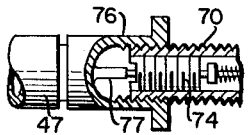
FIGURE 6 is a side elevational view with parts broken away and parts shown in section of the flexible hose and a form of connection of the hose to the valve stem of the tire.

Of these units those designated A, B, C and D are brush holders, one form of which is illustrated in FIGURE 3 and which will be described hereinafter in detail. In number there are four such brush holders, each of which may be in the identical preferred form illustrated in connection with said FIGURE 3.

One such actuating unit E is an air switch, a preferred form of which is illustrated in FIGURE 5. In number there are five air switches, one for each of the wheel units and one for the spare tire, for which there is no need for a brush holder.

The circuits through the various lamps are normally open through the instrumentality of the air switches E incident to recommended tire pressure obtaining in the various tires but closeable automatically when the value of the air pressure in any tire falls below a preselected minimum.

Air switch

Referring more particularly to FIGURE 5, a form of air switch E which has been satisfactorily developed in practice is encased in a cylinder case 39 which is of electrically conductive material, being preferably highly polished as to its internal wall and being internally threaded at both ends as indicated at 40 and 41.

At one end an end plug nut 42 is rotated into the threads 40, having an outstanding flange 43 for compressing a gasket 44 against the adjacent end of the case 39. In the end plug nut 42 is a center or other port 45 communicating with a hollow extension neck 46 which may be integral with the nut 42, as illustrated, or separate therefrom and attached to the nut in any desired manner. One end of a flexible hose or tube 47 is fitted to the neck 46 and may be held in air-tight fashion thereto by any suitable means, for instance by a band 48.

Within the case 39 is contained a fixed contact member or plate 49 of electrically conductive material for which a circular brass block has been found to be suitable. This fixed contact member 49 has a threaded socket 50 exposed through the peripheral edge thereof in alinement with openings in an insulating block 51 and an insulating bushing 52. The block 51 separates and insulates the fixed contact 49 from the near wall of the case 39. The insulating bushing 52 may be in one piece with or separate from the insulating block and this bushing extends through an aperture 53 in the case wall. An insulating gasket 54 may be fitted against the outer end of the bushing 52. A contact screw 55 has its inner threaded end threaded into the socket 50 of the fixed contact 49 and the shank of this screw extends out through the insulating block 51, bushing 52 and gasket 54. At its outer end the contact screw 55 is provided with a head 56 for binding the connector 57 of the insulated wire 38 in electrical contact with the contact screw 55.

The contact screw 55 thus serves to support the fixed contact 49 in the case 39 and to supply electrical potential thereto.

Cooperating with the fixed contact 49 is a movable contact member 59 of electrically conductive material which preferably takes the form of a piston which is also highly polished and may conveniently be made from stainless steel, brass or the like. This movable contact piston is also preferably formed with a groove in its external wall for accommodating therein a piston ring 61 which will preferably be an O-ring. This ring will preferably be of electrically nonconducting material and resistant to lubricants, acids and the like. We have found neoprene as well adapted to this purpose.

The O-ring 61 initially projects outwardly from the periphery of the movable piston contact 59 and is compressed incident to its introduction into the cylinder, preferably from the right-hand end thereof viewed in FIGURE 5.

By having a tight fit in the wall of the cylinder case 39, the piston ring 61 serves to prevent leakage of air pressure from chamber F to chamber G. The polished peripheral edges of the piston 59 engage the cylinder wall with a smoothly sliding fit.

The piston has affixed thereto a piston stem 62 having its outer free end slidable in a smooth-walled port 63 of an adjustable threaded plug nut 64. In the outer portion of the port 63 the plug nut 64 has a circular shoulder 65 in the path of the free end of the piston stem 62 to limit the circuit-opening movement of the piston 59 and its stem 62. In the shouldered portion 65 is an ever-open aperture 66 leading to atmosphere. The piston stem 62 will have a guiding but rather loose fit with large tolerance in the port 63 to permit the free passage of ambient atmospheric air in both ways through the port 63 and aperture 66 to permit breathing of the internal cylinder chamber between the piston 59 and the plug nut 64 in response to movements of the piston 59 and its stem 62 toward and from the fixed contact 49 in order to avoid pressure or vacuum locks in the chamber referred to.

The plug nut 64 contains external sockets 67 for a spanner wrench to rotate the threaded peripheral edge of this nut 64 with the threads 41 of the cylinder case 39 for the purpose of adjusting the tension of a coil spring 68 or other elastic expansible and contractible device which is mounted in the chamber between the piston 59 and the plug nut 64. In the instance shown in FIGURE 5 this elastic member is a spring helix having its end convolutions abutted respectively against the piston 59 and the plug nut 64. In FIGURE 5 the coil spring 68 is shown as under at least partial compression due to the separation of the contacts 49 and 59 incident to the movement of the piston 59 to the right under the influence of inflated tire pressure introduced through the flexible tube 47. The degree of this inflated tire pressure required to open the circuit at the contacts 49, 59 by movement of the piston 59 to the right away from the fixed contact 49 depends upon the tension or compression imposed upon the spring 68.

This adjustment is made by rotating the plug nut 64 axially toward or away from the fixed contact 49. This adjustment should be made when the piston 59 is held immovably against the fixed contact 49. The plug nut 64 may be then run inwardly of the cylinder case 39 imposing a suitable load on the spring 68 until the desired minimum air inflation pressure introduced through the port 45 will begin to move the piston 59 on a circuit opening motion. The circuit may be completed from fixed contact 49 to piston contact 59, to case 39 to ground.

As shown in FIGURE 1, the unit E is grounded to the vehicle frame and the circuit wire 38 is connected to the contact screw 55. The circuit is therefore ordinarily open at the spaced contacts 49, 59, it being understood that the flexible tube 47 is connected to the valve stem of the spare tire 16 by any suitable coupling.

The chamber F (FIGURE 5) is in open communication through the tubular hose 47 and consequently this pressure is so arranged by adjustment of the tension of the coil spring 68 in chamber G that the piston 59 will be held in spaced relation from the fixed contact 49 until such time as the pressure in the spare tire 16 and consequently in the case chamber F falls below a preselected minimum, in which event the spring 68 overbalances the pressure in chamber F and closes piston contact 59 against fixed contact 49 thus closing the circuit through 38 and through the lamp 27 (FIGURE 1) and giving signal to the operator of the vehicle that the tire is at a dangerously low pressure.

It will be understood that the ignition switch 17 acts as a master switch and must be closed before any of the lamp circuits can be activated; otherwise the battery current might be drained away in the absence of the driver at a time when tire pressure fell below the prescribed minimum.

It will be observed, particularly from FIGURE 5, that the fixed contact member 49 is of lesser diameter than the internal diameter of the cylindrical case 39 to accommodate the insulating block 51 at one point of its periphery and to provide a space around the remainder of the periphery for the flow and spread of the tire inflation pressure to the area against the piston contact 59.

It will also be observed that the fixed contact 49 is directly in the path of the entering inflation air through port 45 so that fixed contact 49 baffles the incoming air and prevents surges thereof before such air pressure reaches the free surface of piston contact 59 presented to the chamber F. The circumferential space between the fixed contact 49 and the internal surface of cylinder wall 39 in the aggregate forms a relatively large area for the tire inflation air to exert initial pressure against contact piston 59 when the latter is in contact position with fixed contact 49 so that the air pressure will be immediately effective to open the contacts which involves at least partial compression of the spring 68.

It will be appreciated by those skilled in the art that the air switch E has been carefully designed through research to fulfill its purpose under the most trying conditions and has been rigidly tested. At the same time this air switch has been designed to be manufactured at lowest cost and still offer completely trouble-free operation.

A successful air switch has been made and placed in service in which the cylinder case 39 is only 1½ inches in length with ⅜ inch bore. However, the construction is such that the air switch can be miniatured down to ¾ inch in length with other dimensions miniatured accordingly. Inside, the case is polished and it is threaded at both ends for easy manufacture as a tube and for easy assembly of internal parts through either ends which may then be closed by the plug nuts 42 and 64. The stem 62 does not protrude past the end of the plug nut 64 when the switch is open and has a closing movement of only 1/16 of an inch. The spring 68 normally forces the piston 59 into contact with the fixed contact 49. The tire inflation pressure when at sufficient value to overcome the pressure of the spring 68 will move the piston contact 59 away from the fixed contact 49 and hold the circuit open until such time as leakage of air pressure in the tire occasions a pressure drop in the chamber F.

In other words, the piston 59 is balanced between the spring pressure on one side and the air pressure on the other side. When this balance is destroyed by pressure drop in the chamber F the contacts will be abutted and the circuit through the signal will be closed.

*Wheel structure*

Figure 2:
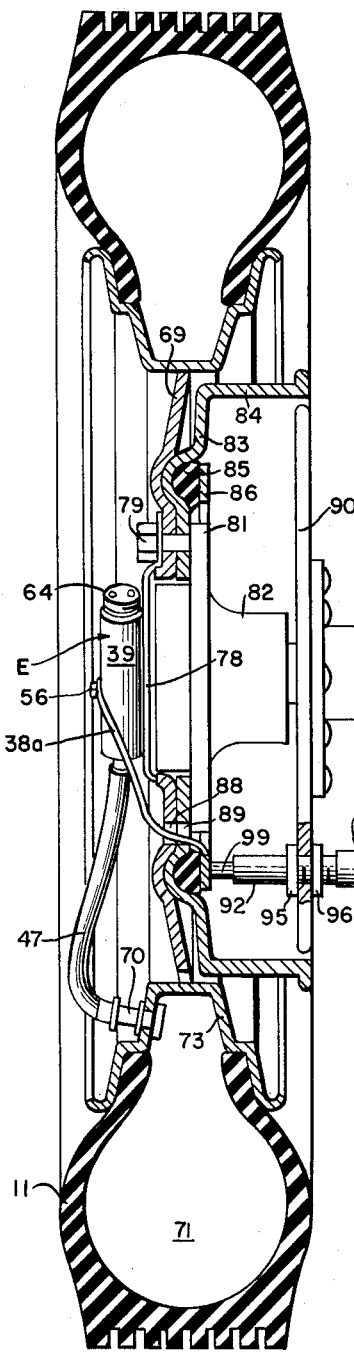
FIGURE 2 is a sectional view taken on an enlarged scale through a wheel, hub and conventional brake drum assembly illustrating a form of application of the invention thereto.

In the case of the running wheels an additional problem is involved as will be appreciated from FIGURES 2 and 4 which, as an example, show the left front tire 11, and the circuit wire 35 thereto. FIGURES 2 and 4 also show a form of connection by the air hose 47 with the tire valve stem 70 which communicates with the interior air chamber 71 of the tire 11 through the wheel rim 73. The valve stem 70 contains the usual valve core 74 and the conventional screw cap which closes the valve stem 70 is removed and a swivel nut 76 applied to the threaded valve stem 70. This swivel nut 76 is on the free end of the tube or hose 47. Such swivel nut 76 has a center pin 77 for compressing the valve core, thus opening the air valve and maintaining the air valve open so that the tire inflation pressure in the internal chamber 71 of the tire may spread through the flexible hose connection 74 and into the chamber F of the air switch (FIGURE 5).

Returning to FIGURE 2, 79 indicates the conventional nuts threaded upon the conventional bolts 80 which project out from the outstanding flange 81 of the wheel hub 82 and receive thereover the outer brake housing 83 and the wheel disc 69. Accordingly, the outer brake housing 83 must rotate and with it the brake drum 84.

A metal circular flat collector band 86 is mounted on the inside of the outer brake housing 83 to rotate with the wheel, this collector band 86 being insulated from all metal parts of the brake or wheel by an insulating ring 85 which may be mounted to the outer brake housing 83 in any suitable manner. The collector band 86 may be mounted to the inside surface of the insulating ring 85 in any suitable manner. The lead wire 38ª from the contact screw 56 of the air switch E is brought through an opening 88 in the wheel disc and through an opening 89 in the outer brake housnig 83 in order to make contact with the metallic collector ring 86.

As shown in FIGURE 2 and also in FIGURE 4, a metallic attaching plate 78 for the air switch E is affixed to the wheel by the bolts 80 and nuts 79. The cylindrical case 39 of the air switch is grounded to the attaching plate 78 and such attaching plate is grounded to the metallic wheel parts.

In FIGURE 2 the non-rotary inner brake housing 90 is shown to which is attached one of the brush holders A, the circuit wire 35 for the front left tire 11 being shown as connected to this unit A.

*Brush holder*

Referring more particularly to FIGURE 3, a preferred form of brush holder A is illustrated on an enlarged scale and in an upright position in which 92 designates a metal cylinder open at both ends and threaded internally at its inner end, as indicated at 93, and also externally at its inner end, as indicated at 94, the external threads 94 running from the inner end of the cylinder 92 all the way to an outstanding flange 95 intermediate the ends of the metal cylinder 92, which flange is abutted against the inner surface of the stationary inner brake housing 90. A nut 96 is run on the threads 94 against the outer surface of the stationary inner brake housing 90 and in cooperation with the flange 95 serves to mount the brush holder A to the stationary inner brake housing 90.

An insulating cylindrical rigid liner 97, coextensive with the metal cylinder 92, is fitted into such cylinder and has an outer externally threaded section 98 threaded into the internal threads 93 of the cylindrical case 92. The metal or carbon brush 99 is slidably fitted in the outer end of the liner 97 with a portion projecting therefrom so that the brush may engage the inner flat side of the collector band 86 against which it is yieldably projected by a coil spring or other expansible member 100 having end convolutions wound about a stud 101 on the inner end of the brush 99 and a stud 102 on an insulating block 103 movable axially in the liner 97. This insulating block 103 is held abutted against the outer end of an internal shank 104 of an adjusting tap 105 which also has an outer internally threaded nut portion 106 spaced from the smooth or plain-walled shank 104 a distance to encompass therebetween the thickness of the liner threaded inner section 98 and the included threaded inner portion of the cylindrical case 92.

An internal bore 107 in the block 103 and an alining internal bore 108 in the shank 104 accommodate therethrough the insulated circuit wire 35 which is electrically connected with the metallic brush 99.

It will be understood that each running wheel is equipped with a brush holder A and an air switch E in the relation shown in FIGURE 2 and that the circuits 34, 35, 36 and 37 for all of the running wheels are all independent, all normally open at their air switches E and are individually closable upon a pressure drop in the tire below a predetermined minimum for which the tension of the coil springs 68 of the air switches are set.

Accordingly, individual alarms will be given to the driver of the vehicle instantaneously that any tire pressure including the spare or spares fall below this dangerous pressure level.

Referring to FIGURE 2, we have found that the collector band 86 may be held in place to the outer brake housing 83 by a cement type of epoxy, which is a nonconductor. The band may also be welded into place by employing an additional steel ring with the neoprene gasket 85 between the two rings and the whole riveted together with smooth surfaced rivets. This permits the outer ring to be welded to the outside housing 83. We have found great success with these methods and it requires a time not more than fifteen minutes to make installations for each wheel.

In the use of the invention with trucks having dual wheels, two air switches may be used.

With the invention there are no parts to wear out with the exception of the wheel brushes which should run well over 100,000 miles without being changed. The brush holders are so designed that the change may be made in a matter of minutes.

Although we have disclosed herein the best form of the invention known to us at this time, we reserve the right to all such modifications and changes as may come within the scope of the following claims.

What we claim is:
1. A tire pressure signal system for vehicle comprising
    (a) a normally open circuit,
    (b) a signal in the circuit adapted to be actuated on closing of the circuit,
    (c) an air switch in the circuit comprising a switch case,
    (d) means at one end of the case for introducing into the case air from a tire,
    (e) a chamber in the opposite end portion of the case,
    (f) a piston contact working in said chamber in substantial alignment with said means for introducing tire air into the case,
    (g) a fixed contact in said case,
    (h) said piston contact being held out of contact with said fixed contact by the air pressure in the tire as long as the tire pressure remains at a preselected value, and
    (i) means biasing said piston contact into engagement with said fixed contact when the tire pressure falls below said preselected value,
    (j) an insulated collector band on each vehicle wheel in electrical connection with one of said contacts and affixed to rotate with the wheel, and
    (k) a brush holder comprising a holder case affixed to a stationary part of the vehicle,
    (l) a brush insulated from and slidably mounted in an outer part of the brush case,
    (m) means for yieldably projecting the brush outwardly of the holder case and into engagement with the rotating band,
    (n) means for adjusting the projecting characteristic of said brush projecting means,

(o) means for accommodating a circuit wire through the inner part of the case and through the adjusting means,
(p) an insulating lining in the holder case in which the brush is slidably fitted, said adjusting means having
(q) spaced concentric inner and outer members,
(r) the inner member fitted for axial and rotary movement in the lining and the outer member in threaded relation to the outer surface of the holder case, and
(s) an insulating member abutted against the inner member and movably fitted in the lining, said yieldable projecting means engaging said insulating member at one end and the brush at the other end.

2. A tire pressure signal system for vehicles comprising
(a) a normally open circuit,
(b) a signal in the circuit adapted to be actuated on closing of the circuit,
(c) relatively movable contacts in the circuit biased to a closed position,
(d) means subject to tire pressure for normally maintaining the contacts open as long as the tire pressure remains above a preselected value,
(e) an insulated collector band on each vehicle wheel in electrical connection with one of said contacts and affixed to rotate with the wheel,
(f) a brush holder comprising a holder case affixed to a stationary part of the vehicle,
(g) a brush insulated from and slidably mounted in an outer part of the brush case,
(h) means for yieldably projecting the brush outwardly of the holder case and into engagement with the rotating band,
(i) means for adjusting the projecting characteristic of said brush projecting means,
(j) means for accommodating a circuit wire through the inner part of the case and through the adjusting means,
(k) an insulating lining in the holder case in which the brush is slidably fitted, said adjusting means having
(l) spaced concentric inner and outer members,
(m) the inner member fitted for axial and rotary movement in the lining and the outer member in threaded relation to the outer surface of the holder case, and
(n) an insulating member abutted against the inner member and movably fitted in the lining, said yieldable projecting means engaging said insulating member at one end and the brush at the other end.

References Cited by the Examiner
UNITED STATES PATENTS

| | | | |
|---|---|---|---|
| 1,975,639 | 10/1934 | Greene | 200—61.25 |
| 2,040,554 | 5/1936 | Holmes | 200—61.25 |
| 2,621,274 | 12/1952 | Maddox | 340—58 X |
| 2,669,876 | 2/1954 | Lentz | 340—58 X |
| 2,727,221 | 12/1955 | Sprigg | 340—58 X |

NEIL C. READ, *Primary Examiner.*

A. H. WARING, *Assistant Examiner.*